Jan. 5, 1943.    R. S. MARTIN    2,307,526
DEVICE FOR SHARPENING LAWN MOWERS
Filed June 22, 1940
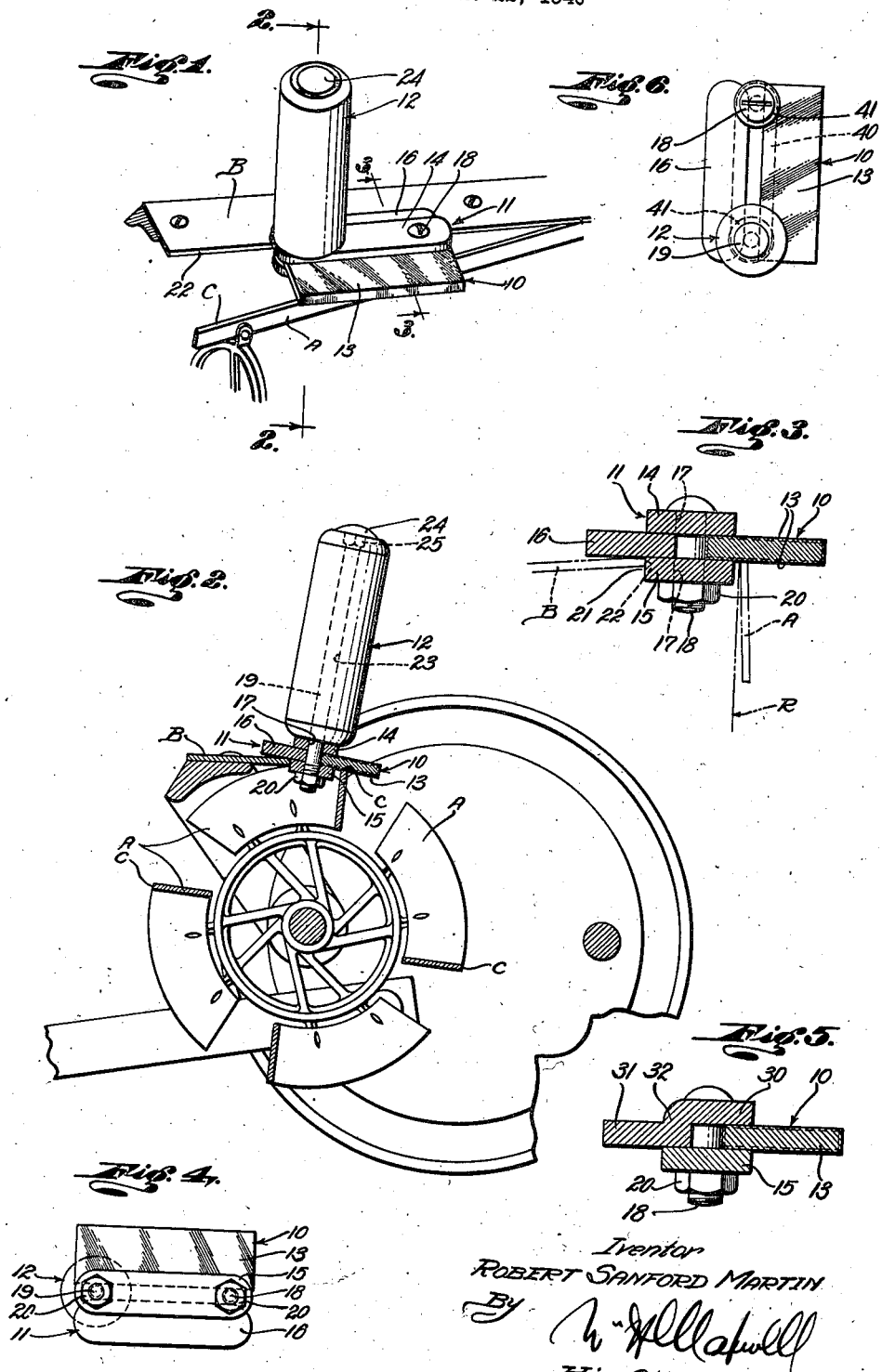
Inventor
ROBERT SANFORD MARTIN
By
His Attorney Patented Jan. 5, 1943

2,307,526

UNITED STATES PATENT OFFICE 2,307,526

DEVICE FOR SHARPENING LAWN MOWERS

Robert Sanford Martin, Glendale, Calif.

Application June 22, 1940, Serial No. 341,897

3 Claims. (Cl. 76—82.1)

This invention relates to a sharpening tool and relates more particularly to a tool or device for sharpening lawn mowers and lawn edgers. A general object of this invention is to provide a simple, inexpensive, and highly effective lawn mower sharpener.

Another object of this invention is to provide a device for sharpening lawn mowers that is simple and easy to operate and that is capable of sharpening the rotary blades of practically all types and makes of lawn mowers and edges.

Another object of this invention is to provide a device for sharpening lawn mowers that operates to sharpen or file the cutting edges of the rotary mower blades to the correct angle, thereby assuring the most efficient cutting action.

Another object of this invention is to provide a lawn mower or sharpening device of the character referred to that sharpens the rotary blades to the correct angle throughout the entire lengths of the blades without variation in the angle and without interference by the wheels of the mower.

Another object of this invention is to provide a lawn mower sharpening device of the character referred to that embodies a file for sharpening or filing the mower blades arranged and proportioned to present an effective filing area of maximum length, to have its cut disposed to most efficiently act on the mower blades, and to be reversible so that it is long lived.

Another object of this invention is to provide a lawn mower sharpening device of the character referred to that embodies a minimum number of simple, inexpensive parts and that is easy to assemble.

A further object of this invention is to provide a mower sharpening device of the character mentioned embodying a novel handle means in which one of the file retaining or clamping bolts serves to attach or secure the handle.

The various objects and features of my invention will be fully understood from the following detailed description of typical preferred forms and applications of the invention, throughout which description reference is made to the accompanying drawing, in which:

Fig. 1 is a perspective view of the device of the present invention showing it in the operative position on a portion of a typical lawn mower. Fig. 2 is an enlarged vertical detailed sectional view taken substantially as indicated by line 2—2 on Fig. 1 with the handle of the device and certain parts of the mower in side elevation. Fig. 3 is an enlarged transverse detailed sectional view of the device taken as indicated by line 3—3 on Fig. 1. Fig. 4 is an elevation of the lower side of the device. Fig. 5 is a vertical sectional view of a modified form of construction of the invention and Fig. 6 is an elevation or plan view of still another form of construction.

The device of the present invention may be said to comprise, generally, a sharpening element or file 10, means 11 for holding the file 10 and movable along the cutter bar B of a lawn mower to guide the file 10 so that it acts on the rotary blades A of the mower, and a handle 12 associated with the file holding means 11.

The sharpening element or file 10 is provided to act on or file the active edges C of the rotary lawn mower blades A. The file 10 is an elongate member and is preferably rectangular in transverse cross section to present two flat surfaces, namely upper and lower surfaces 13. As illustrated, the file 10 may have straight, generally parallel longitudinal edges. Assuming the device to be in operation the lower surface 13 of the file 10 is the active surface and, if desired, this may be the only surface of the file that is "cut." However, it is usually preferred to employ a file 10 whose upper and lower surfaces 13 are both "cut" so that the file may be reversed or turned side for side when worn on its lower side, to increase its active life. While the file 10 may have any "cut" I prefer to employ a single crosscut file, that is, a file whose sharpened ridges or cuts extend generally transverse and at an angle to both the longitudinal and transverse axes of the file. This form of "cut" is most effective when the file is moved longitudinally relative to the work, as in the present case where the file is moved longitudinally to sharpen the blade edges C. The opposite ends of the file 10 may be straight and provided with suitable rounded or bevelled corners.

The means 11 serves to clamp or hold the file 10, acts as a guide for the file 10, and forms the body or body assembly of the device. While the means 11 may be varied greatly in construction I prefer to employ the general construction illustrated which comprises upper and lower clamping members 14 and 15 and a guide member 16. The members 14, 15 and 16 are flat elongate parts having straight parallel longitudinal edges and suitably rounded ends. In practice the members 14, 15 and 16 are of substantially the same length as the file 10. It is preferred to make the member 16 of about the same thickness as the file 10. The upper and lower members 14 and 15 are arranged in vertically spaced parallel relation and longitudinal edge portions of the file 10 and the guide member 16 are received between longitudinal edge portions of the spaced members 14 and 15. The file 10 and the guide member 16 preferably have substantial portions received between the clamp members 14 and 15. As best illustrated in Fig. 3 of the drawing the inner edges of the file 10 and the guide member 16 are in spaced adjacent relation. The file 10 is of sufficient width to have a substantial portion project outwardly or laterally from the members 14 and 15 and this projecting portion forms the active part of the file. The guide member 16 also has its major portion projecting clear of the clamp members 14 and 15.

Pairs of vertically spaced openings 17 are provided in the medial longitudinal plane of the members 14 and 15 adjacent the ends of the members. A clamp screw or bolt 18 is passed through one set of openings 17 and a longer bolt 19 is passed through the other set of openings 17. The long bolt 19 serves as a spindle or carrier for the handle 12, as will be later described. The head of the bolt 18 engages against the upper surface of the upper clamp member 14 and nuts 20 are threaded on the lower ends of the bolts 18 and 19 to clamp against the under side of the member 15. The members 14 and 15 are tightly clamped against the file 10 and the member 16 to securely hold the same. It will be seen that the file 10 clamped between the members 14 and 15, as just described, presents an extensive lower surface 13 for acting on the mower blades A and that the guide member 16 and the rear edge of the clamp member 15 define a longitudinally extending channel or groove 21 that cooperates with or receives the forward edge 22 of the stationary cutter bar B of the mower. The engagement of the channel or groove 21 with the stationary cutter bar B guides the device and maintains the file 10 in correct active engagement with the cutting edges C of the rotary blades A.

The handle 12 is a suitably shaped member projecting upwardly from the file holding means 11 to facilitate the operation or manipulation of the device. As illustrated the handle 12 may be a generally cylindrical elongate member of wood or the like. It may be preferred to provide the handle 12 with rounded ends. A longitudinal opening 23 extends through the handle 12 and passes the clamping bolt 19. The head 24 of the bolt 23 engages against the upper end of the handle 12 and the bolt may have a polygonal part 25 engaged in the upper portion of the handle 12. When the nut 20 on the lower end of the bolt 19 is clamped against the member 15 the handle 12 is securely retained or held between the upper member 14 and the bolt head 24.

In operating or using the sharpening tool of the present invention it is preferred to first turn the lawn mower upside down on a bench, or the like, so that the under side of its stationary cutter bar B faces upwardly, as shown in the drawings. The handle 12 of the device is grasped and the device is arranged or positioned so that the channel or groove 21 receives the edge 22 of the stationary blade B and the lower face 13 of the file 10 engages the cutting edge C of the rotary blade A adjacent the stationary cutter bar B. With the device arranged in this manner adjacent one end of the lawn mower the lower clamp member 15 has what I will term its forward end between the stationary blade B and the adjacent rotary blade A. The device is then pushed longitudinally along the stationary blade B toward the other side of the mower. A slight downward pressure is exerted on the device as it is moved along the blade B. Figs. 1 and 2 of the drawing illustrate the device in the operative position during the first part of its movement. It is preferred to start the device at the extreme end of the stationary cutter blade B so that the file 10 is initially in engagement with the end portion of the adjacent rotary blade A. As the device is moved or pushed along the stationary blade B the active lower face 13 of the file 10 abrades or files the edge C of the blade A. The rotary cutter of the lawn mower turns as the device is moved along the blade B, this action resulting from the engagement of the forward end of the member 15 with the helically curved blade A. The device is moved or pushed along the stationary blade B until it reaches the end of the blade, this operation assuring the filing of the blade A throughout its entire length.

When the device is used as described above, the lower active face 13 of the file 10 files the active edge C of the rotary blade A to an angle that is most effective for the grass cutting. Attention is now directed to Figs. 2 and 3 of the drawing which illustrates the file 10 acting on the blade A to provide the blade with the angular cutting edge C. From an inspection of these figures it will be seen that the active lower face 13 of the file 10 is disposed at an angle greater than 90° to a radial plane that intersects the axis of rotation of the rotary motor structure and the point of engagement of the file with the blade edge C. The file 13 positioned in this manner cuts or files the edge C to an angle of about 3° to the radial plane and this cutting angle has been found to be most effective although the cutting angle may vary slightly in different makes and types of mowers. In Fig. 3 the line R is a line extending radially from the axis of rotation of the rotary mower cutter, which line extends to the point of contact of the file 10 with the edge of a rotary blade A. It will be seen that this line R extends at about 3° to the plane occupied by the blade A so that the file 10 files or faces the edge of the blade A to occupy a plane lying at about 87° to the broad face of the rotary blade. The desirable angular relation between the file 10 and the active edge of the blade A is maintained by the engagement of the members 15 and 16 with the cutter bar B and the engagement of the file with the rotary blade A. The engagement of the file 10 with the cutting edge C and the engagement of the channel or groove 21 with the edge 22 of the stationary blade B maintains the file 10 in the position just described throughout the entire stroke of the device. Accordingly, the file 10 operates to maintain its correct cutting angle to uniformly sharpen or file the blade A throughout its length. In the event the blade A has high spots or irregularities these may be corrected or removed by reciprocating the file 10 with short strokes along the stationary blade B at the irregular points.

When the device has been moved along the stationary blade B from one end to the other, filing one blade A throughout its length, the device is returned to the first-engaged end of the stationary blade B and the action is repeated on the next rotary blade A. In most cases the turning movement given the rotary element of the mower by the complete stroke of the sharpening device advances the next blade A to the correct position for sharpening or, in some cases, it may be necessary to give the rotary element of the mower a slight turn to bring the next blade A into position for filing. The several blades A of the mower may be successively filed in the manner described above and, if necesary, the operations may be repeated on the several blades until their edges C are sharp.

The device or sharpening tool constructed as illustrated is adapted to sharpen the rotary blades of the large majority of lawn mowers. However, there are certain lawn mowers whose rotary blades are pitched in the opposite direction to those illustrated in the drawing and to adapt the tool for the sharpening of such mowers, the handle 12 is removed and is secured to the other side of the device or the two nuts 20 are loosened and the file 10 and the guide member 16 are reversed in position. Either of these operations adapts the device for use on the mowers whose blades A are pitched in the opposite direction to those illustrated. After extensive use it may be found that the lower active face 13 of the file 10 is worn or dulled where it has acted on the mower blades B. In this case the nuts 20 are backed off or loosened and the file 10 is moved a short distance longitudinally in either direction to bring an unworn cutting area in position to act on the blades B whereupon the nuts 20 are tightened down to put the device in condition for further use. When the surface 13 has been worn over a substantial part of its area the file 10 may be removed. The file 10 may then either be replaced by a new file or may be inverted so that its unworn surface 13 is presented downwardly for use or may be moved slightly forward to bring out new filing surface. The lawn mower sharpening device of the present invention is simple and inexpensive to manufacture and is highly effective in operation.

Figure 5 of the drawing illustrates a form of the invention wherein one of the clamp members and the guide member are combined in a single piece or element. In the arrangement shown in Figure 5 the file 10 and one of the clamp members, say the member 15, may be the same as in the above described form of the invention. The file 10 has a longitudinal edge portion gripped or clamped between the member 15 and a part 30. The part 30 is spaced from and lies in a plane parallel with the plane of the clamp member 15. A guide part 31 lies in the same plane as the file 10 and is connected with the clamp part 30 by an intermediate connecting part 32. The parts 30 and 31 lies in parallel offset planes and are integrally connected by the part 32. The guide part 31 corresponds to the guide member 16 in shape, location and function. The guide part 31 is adapted to ride along the face or corner of the cutter bar B in the same manner as the guide member 16. The bolts 18 and 19 and the nuts 20 may be the same as in the previously described form of the invention and urge the member 15 and the part 30 toward one another so that the file 10 is securely clamped between these elements. The structure of Figure 5 has the same features and operation as the construction of Figures 1 to 4, inclusive, and differs from the previously described form of the invention in that one of the clamp members and the guide member are combined in the single integral element 30—31—32. It is to be understood that the part 30 may constitute either the upper or the lower clamp element of the device.

The alternative construction illustrated in Figure 6 of the drawing comprises, generally, the file 10, a clamp member 40, a pair of clamping washers 41, the guide member 16 and the handle 12. The file 10, the guide member 16 and the handle 12 may be the same as the corresponding elements shown in Figures 1 to 4, inclusive. The clamp member 40 may be similar to or identical with the clamp member 14 or the clamp member 15. It is preferred to arrange the clamp member 40 at the under side of the device to engage against the under side of the file 10 and the guide member 16, to correspond in location to the above described member 15. The clamp washers 41 take the place of the upper clamp member 14 serving to engage down against the upper face of the file 10 and the guide member 16. The washers 41 are arranged on the bolts 18 and 19 and, as illustrated, one of the washers is engaged under the lower end of the handle 12. When the bolts 18 and 19 are tightened down the washers 41 and the clamp member 40 securely grip and hold the file 10 and the guide member 16. While it is possible to arrange the clamp member 40 at the upper side of the device and the washers 41 at the lower side of the device it is preferred to locate the parts as shown so that the long inner edge of the guide member 40 may cooperate with the cutter bar B to assist in guiding the device. The mower blade sharpener shown in Figure 6 is operated in the same manner as the previously described forms of the invention.

Having described only typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. A device for sharpening the rotary helical blades of a mower having a relatively stationary cutter bar with which the rotary blades co-act, the device comprising spaced apart upper and lower clamp plates, a file held between the edge portions of the clamp plates at one side of the device, the file having cut upper and lower surfaces, a guide member held between the edge portions of the clamp plates at the other side of the device and, together with the edge of the lower clamp plate, cooperating with the cutter bar to guide the file so that the lower face of the file acts on an edge of a rotary blade, and means for forcing the clamp plates toward one another to grip and hold the file and guide member and adapted to be loosened to permit removal and inversion of the file, said means comprising bolts adjacent the ends of the plates, one bolt extending upwardly from the upper clamp plate, and a handle on said bolt clamped between the head of the bolt and the upper clamp plate.

2. A device for sharpening the rotary blades of a mower having a relatively stationary cutter bar with which the rotary blades co-act, the device comprising an elongate file for acting on the cutting edges of the helical blades, a pair of elongate plates spaced apart in generally parallel relation so that the inner opposing surfaces of the plates have cooperation with the opposite side surfaces of the file, the file extending beyond corresponding longitudinal edges of the plates to have engagement with the rotary blades, a flat elongate guide member engaged between the plates to project beyond the other longitudinal edges of the plates to ride on the stationary cutter bar to maintain the file in the correct angular relation to the rotary blades, said other longitudinal edge of one of the plates being adapted to ride along the edge of the cutter bar to guide the file, screw means for forcing the plates toward one another so that the file and guide member are clamped between said opposing surfaces of the plates, and a handle projecting laterally from one of the plates.

3. A device for sharpening the rotary blades of a mower having a relatively stationary cutter bar with which the rotary blades co-act, the device comprising an elongate file for acting on the cutting edges of the helical blades, a pair of elongate plates spaced apart in generally parallel relation so that the inner opposing surfaces of the plates have cooperation with the opposite side surfaces of the file, the file extending beyond corresponding longitudinal edges of the plates to have engagement with the rotary blades, a flat elongate guide member engaged between the plates to project beyond the other longitudinal edges of the plates to ride on the stationary cutter bar to maintain the file in the correct angular relation to the rotary blades, said other longitudinal edge of one of the plates being adapted to ride along the edge of the cutter bar to guide the file, screw means for forcing the plates toward one another so that the file and guide member are clamped between said opposing surfaces of the plates, the plates having spaced transverse openings, screws passed through the openings to force the plates toward one another to grip the file and guide member, and a handle on one of the screws.

ROBERT SANFORD MARTIN.